United States Patent
Benz et al.

(10) Patent No.: US 6,187,066 B1
(45) Date of Patent: *Feb. 13, 2001

(54) CENTRAL HEATING DEVICE FOR A GAS-GENERATING SYSTEM

(75) Inventors: Uwe Benz, Uhldingen; Stefan Boneberg, Blaustein; Dietmar Heil, Deggenhausertal, all of (DE)

(73) Assignee: DaimlerChrysler AG, Stuttgart (DE)

( * ) Notice: Under 35 U.S.C. 154(b), the term of this patent shall be extended for 0 days.

This patent is subject to a terminal disclaimer.

(21) Appl. No.: 08/937,357

(22) Filed: Sep. 24, 1997

(30) Foreign Application Priority Data

Sep. 24, 1996 (DE) ................................ 196 39 150

(51) Int. Cl.$^7$ ................... B01J 8/04; C01B 3/02
(52) U.S. Cl. ............... 48/127.9; 48/61; 422/198
(58) Field of Search ............... 48/61, 103, 127.7, 48/198.1, 127.9; 422/169, 173, 170, 198, 199, 211, 204, 177; 60/300, 284, 299

(56) References Cited

U.S. PATENT DOCUMENTS

| | | | |
|---|---|---|---|
| 3,783,619 | * | 1/1974 | Alquist ................................ 60/288 |
| 3,810,361 | * | 5/1974 | Weaving et al. ..................... 60/288 |
| 4,112,876 | | 9/1978 | Mentschel ............................ 123/3 |
| 4,473,622 | * | 9/1984 | Chludzinski et al. ................ 429/19 |
| 4,714,593 | | 12/1987 | Naito et al. ....................... 422/197 |
| 4,788,004 | | 11/1988 | Pinto et al. ....................... 252/373 |
| 4,909,808 | | 3/1990 | Voecks .................................. 48/94 |
| 5,143,701 | * | 9/1992 | Schatz ............................... 422/177 |
| 5,180,561 | | 1/1993 | Morishima et al. ................. 422/191 |
| 5,270,127 | * | 12/1993 | Koga et al. .......................... 429/17 |
| 5,340,020 | * | 8/1994 | Maus et al. ..................... 237/12.3 C |
| 5,421,719 | * | 6/1995 | Saito et al. ........................... 431/7 |
| 5,425,632 | * | 6/1995 | Kazunori et al. ..................... 431/7 |
| 5,511,972 | * | 4/1996 | Dalla Betta et al. ............... 431/170 |
| 5,516,344 | * | 5/1996 | Corrigan ........................... 48/127.9 |
| 5,537,321 | * | 7/1996 | Yoshizaki et al. ................... 701/99 |
| 5,618,500 | * | 4/1997 | Wang ................................ 422/177 |
| 5,753,194 | * | 5/1998 | Heil et al. ......................... 422/190 |
| 5,758,498 | * | 6/1998 | Fukui ................................. 60/300 |
| 5,791,140 | * | 8/1998 | Shimasaki et al. .................. 60/284 |
| 5,878,567 | * | 3/1999 | Adamczyk et al. .................. 60/274 |
| 5,928,614 | * | 7/1999 | Autenrieth et al. ................ 422/211 |

FOREIGN PATENT DOCUMENTS

| | | |
|---|---|---|
| 33 45 958 A1 | 12/1983 | (DE) . |
| 195 48 189 A1 | 12/1995 | (DE) . |
| 0 757 968 A1 | 2/1997 | (EP) . |
| 58-108291 | 6/1983 | (JP) . |
| 58-219945 | 12/1983 | (JP) . |
| 61-269864 | 11/1986 | (JP) . |
| 4-164802 | 6/1992 | (JP) . |
| WO96/26892 | 9/1996 | (WO) . |

* cited by examiner

Primary Examiner—Shrive Beck
Assistant Examiner—Frederick Varcoe
(74) Attorney, Agent, or Firm—Evenson, McKeown, Edwards & Lenahan, P.L.L.C.

(57) ABSTRACT

In a device for providing heating energy to a gas-generating system by means of essentially complete catalytic combustion of a fuel on a suitable catalyst material, heat energy is transferred directly or by means of a heat-conducting medium from the catalytic burner to the gas-generating system. To improve the starting behavior and the exhaust emissions, the device comprises three components that are at least temporarily traversed by fuel, with a cold-start component having an electrical heating device. The central component is preferably designed as a filter press with an integrated heat exchanger. A third, unheated, stage is also provided for residual gas combustion.

16 Claims, 3 Drawing Sheets

CENTRAL HEATING DEVICE FOR A GAS-GENERATING SYSTEM

BACKGROUND AND SUMMARY OF THE INVENTION

The invention relates to a device for providing heat energy for a gas-generating system in which hydrogen gas is generated from a gas which contains hydrocarbons.

For example, in the operation of fuel cells for mobile applications, hydrogen is generated from a raw gas containing hydrocarbons, especially methanol, by reformation of steam or partial oxidation. Heat energy is required to heat the system for a cold start, for evaporation and superheating of water and methanol, and for covering the energy requirement of endothermal steam reformation.

In this technology, the energy for covering the heat requirement is provided for example by burning hydrogen and/or methanol with an open flame. However, such systems exhibit poor partial load behavior because of the lack of flame stability. In addition, because of the high combustion temperatures, heat oxides of nitrogen are formed, which is especially undesirable for mobile applications.

In addition, heat-generating systems based on catalytic combustion of gases containing hydrocarbons are known, in which the temperatures are kept significantly below 1000° C. during combustion so that formation of thermal oxides of nitrogen is prevented. U.S. Pat. No. 4,909,808, for example, discloses such a device in which a fuel/air mixture is supplied to a combustion chamber to provide heat energy for steam reformation, and is oxidized therein catalytically.

In such devices, the required heat energy can be generated either directly in the consuming component or in a central component, with the heat being supplied in the second case by a heat-conducting medium. An example of the first embodiment is known from U.S. Pat. No. 5,180,561. In this case, hydrogen is generated from methane by steam reformation in a plate reformer, with reaction chambers and catalytic combustion chambers alternating in the plate reformer. An example of the second embodiment is known from JP 4-164802 A. In this case, hydrogen is produced in a reactor by steam reformation of methanol, with the reactor being heated indirectly by a hot gas stream generated in a central catalytic combustion chamber. In order to ensure a rapid starting process, this Japanese document provides that, on starting the device, a mixture of methanol and preheated air is evaporated and supplied to the combustion chamber and a switch is made to a combustion gas with a higher ignition temperature only after a higher temperature has been reached.

The goal of the invention is to improve a device of the generic type described above for providing heat energy for a gas-generating system in terms of starting behavior and exhaust emissions, as well as providing a method for starting this device.

The device according to the invention has the advantage that cold-starting behavior is further improved and emission of unburned fuel can be prevented even in the partial load range. The provision of an additional component for cold-starting with an integrated heating device ensures rapid heating of the entire system. By using a residual gas component, especially in the cold-starting phase and in the partial load range, complete reaction of the fuel is ensured so that the undesired escape of unburned fuel is avoided. In the main combustion chamber, which is advantageously designed as a filter press, a heat exchanger is integrated to permit a compact design and good heat transfer.

By dividing the entire system into three components, with the cold-start component being designed for rapid response, the central component for high power density, and the residual gas component for complete reaction, a total system with rapid cold-start behavior, low exhaust emissions in all operating ranges, high maximum fuel concentration, and hence high load injection, and high dynamics during load changes is provided. In addition, the system can be readily regulated by adding fuel.

The claimed central component has a simplified design by virtue of the common supply of fuel and air. The possibility of adjusting a temperature profile deliberately over the length of the main combustion chamber makes it possible significantly to improve the efficiency, since the device can be operated with a high fuel concentration, high power level per combustion chamber, and a good distribution of the reaction over the entire length.

Other objects, advantages and novel features of the present invention will become apparent from the following detailed description of the invention when considered in conjunction with the accompanying drawings.

DETAILED DESCRIPTION OF THE DRAWINGS

The invention will now be described with reference to an embodiment in which hydrogen is produced for mobile applications of fuel cells by steam reformation from methanol. The scope of protection however is not intended to be limited to this example. Instead, the device can be used in general for all gas-generating systems in which heat energy is required and provided by a central heating device.

Figure 1:
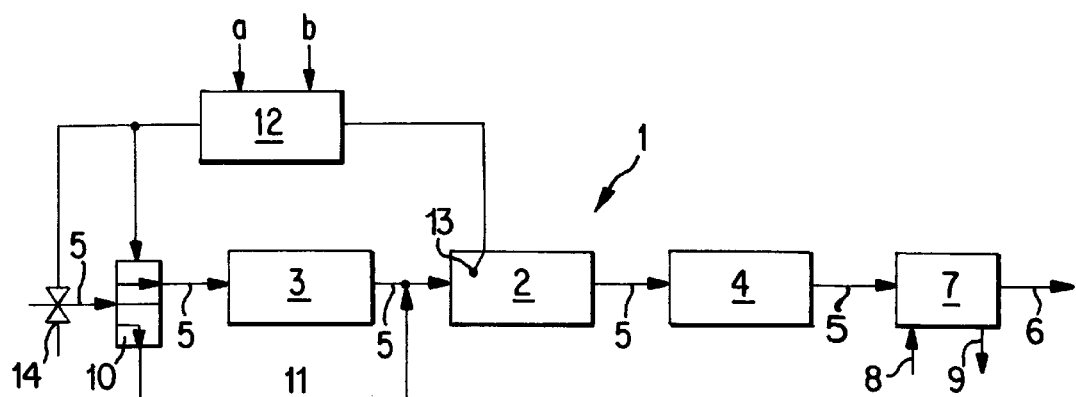
FIGS. 1 to 3 are schematic block diagrams which show three embodiments of the device according to the invention.

As depicted in FIG. 1, the device for generating heat energy, designated as a whole by 1, has three components 2–4. In addition to central component 2, in which the majority of the fuel is reacted during normal operation, two additional components 3 and 4 are provided. All three components 2–4 have combustion chambers, in each of which a catalyst suitable for catalytic oxidation of the fuel is located. For this purpose, a noble metal catalyst containing platinum or palladium or a mixture thereof is preferably used as the active component.

A mixture of a gas containing oxygen and a fuel is added through a first line 5. The gas containing oxygen is preferably ambient air. The fuel can be any gaseous or liquid medium that can be oxidized catalytically. In the embodiment described, for example, the starting material used can be methanol, while the product gas can be hydrogen or hydrogen-containing fuel cell offgas. Components 3, 2, and 4 are located in this first line 5 in the flow direction. After passing through all components 2–4, the reacted gas mixture is then carried away through a second line 6.

The second component 3 has the task of ensuring a response of system 1 that is as rapid as possible for a cold start. Therefore, an electrical heating device is provided in the combustion chamber of cold-starting component 3. In addition, it is possible to preheat the air stream supplied. When liquid methanol is used, it is preferably injected or atomized in the preheated air stream. Advantageous embodiments of the first component are described below.

After passing through cold-start component 3, the at least partially oxidized fuel is conducted through first line 5 into the combustion chamber of central component 2. In this case, a heat exchanger is provided for transferring heat energy to any heat-conducting medium or directly to the device to be heated. The device to be heated can be a reformer or an evaporator for example. For this purpose, central component 2 is preferably designed as a filter press, in which reaction chambers and heat carrier chambers alternate. The exact structure of the second component is described in greater detail below with reference to FIG. 4. Central component 2 is designed so that the majority of the fuel is reacted in it, based on the upper load range.

After passing through central component 2, the gas mixture finally enters residual gas component 4. The latter is designed for residual gas combustion that is as complete as possible, especially during the cold-starting phase, in the lower partial load range and at full load as well. The residual gas component 4, like cold-starting component 3, is not in contact with the heat-conducting medium or the heat-consuming device. As a result, excessively rapid cooling of these components 3, 4 with a low fuel feed rate and hence incomplete oxidation of the fuel is prevented.

In addition to the three components 2–4, an additional heat exchanger 7 can be provided in second line 6. No catalytic oxidation takes place In heat exchanger 7, but the residual heat contained in the offgas is transferred to a heat-conducting medium. In this case, the supply and exhaust lines 8, 9 for the heat-conducting medium can either be integrated into the existing heat-conductor circuit or a separate heat-conductor circuit can be provided. The completely oxidized fuel-air mixture is finally discharged into the environment through second line 6.

A two-way valve 10 is provided in first line 5 upstream from cold-starting component 3. In the first switch position of this two-way valve 10, the fuel/air mixture is conducted through cold-starting component 3, while in the second switch position, the fuel/air mixture is conducted through a bypass line 11 at cold-start component 3. Bypass line 11 terminates in first line 5 between cold-start component 3 and central component 2. A control device 12 is provided to control two-way valve 10. This control device 12 receives temperature $T_2$ as an input parameter in central component 2, said temperature being detected with the aid of a temperature sensor 13. Of course, other operating parameters (indicated schematically by arrows a and b in FIGS. 1–3) can be used as input parameters. In addition, a valve 14 is provided in first line 5 for regulating the fuel feed.

At a cold start, a reduced quantity of fuel/air mixture is conducted through cold-start component 3. Since an electrical heating device is provided here, the reaction starts quickly, while the reaction does not yet begin in central component 2, designed for high power density. As a result of the reaction in cold-starting component 3, however, the fuel/air mixture takes up heat which is given off once again, at least partially, during subsequent flow through central component 2 and thus results in a heating of central component 2. When the starting temperature of the catalyst material being used is reached, the reaction then begins in central component 2. This is detected by control device 12 from temperature sensor 13 showing that temperature $T_2$ has reached a predetermined limiting temperature $T_G$. At this point in time, two-way valve 10 is switched so that the fuel/air mixture bypasses cold-starting component 3. At the same time, by adjusting valve 14, the fuel supply is increased until device 1 reaches a predetermined operating temperature $T_{des}$. This switch is necessary because during warmed-up operation, no fuel/air mixture should be conducted through cold-start component 3 since this would lead to overheating in the case of high fuel concentrations, and hence cause damage to the catalyst material in cold-starting component 3.

By optimizing the three components 2–4 with respect to different requirements, a total system can be created that is improved in terms of starting behavior and exhaust emissions. For this purpose, the three components 2–4 are designed for good efficiency, rapid response, and complete conversion. In such a system, higher fuel concentrations are possible. In addition, a high dynamic, wide load spread, and easy controllability of the heat requirement are provided by a fuel metering system for example. Embodiments of individual components 2 to 4 will be described in greater detail below.

Figure 2:
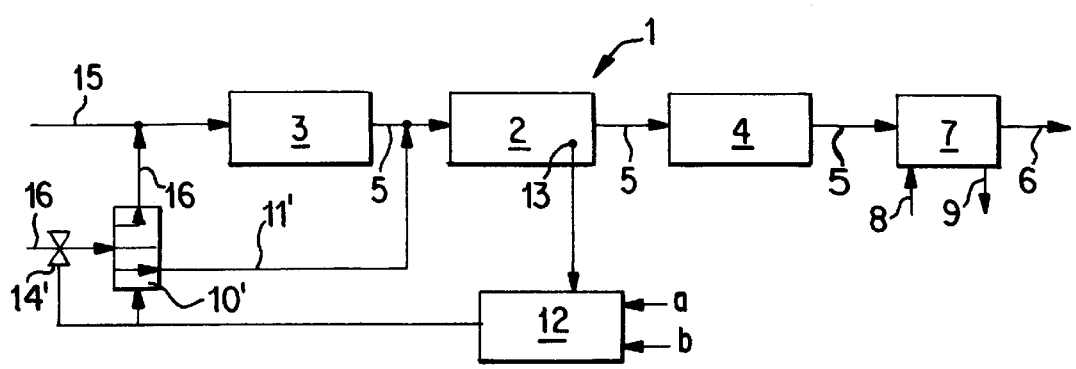

A second embodiment is shown in FIG. 2, in which parts that are the same as those in FIG. 1 have been given the same reference numbers. In contrast to FIG. 1, there are separate feed lines 15, 16 in this device for the air and fuel. Valve 14', controlled by control device 12, and two-way valve 10', in contrast to the first embodiment, are not located in first line 5 but in fuel supply line 16, while air supply line 15 terminates directly in cold-start component 3. The fuel supply line 16 terminates upstream of cold-start component 3 in air supply line 15, while fuel bypass line 11' links two-way valve 10 with first line 5 downstream from cold-start component 3. In the first switch position of this two-way valve 10, the fuel is conducted into air supply line 15. There the fuel mixes with the air so that once again a fuel/air mixture is conducted through cold-start component 3. In the second switch position on the other hand, the fuel is carried through fuel bypass line 11' around cold-start component 3. In this second switch position, therefore, cold-start component 3 is traversed only by the air, while a fuel/air mixture flows through a central component 2 and residual gas component 4. Valve 14 and two-way valve 10 are controlled analogously to the first embodiment as a function of temperature $T_2$ by control device 12.

Figure 3:
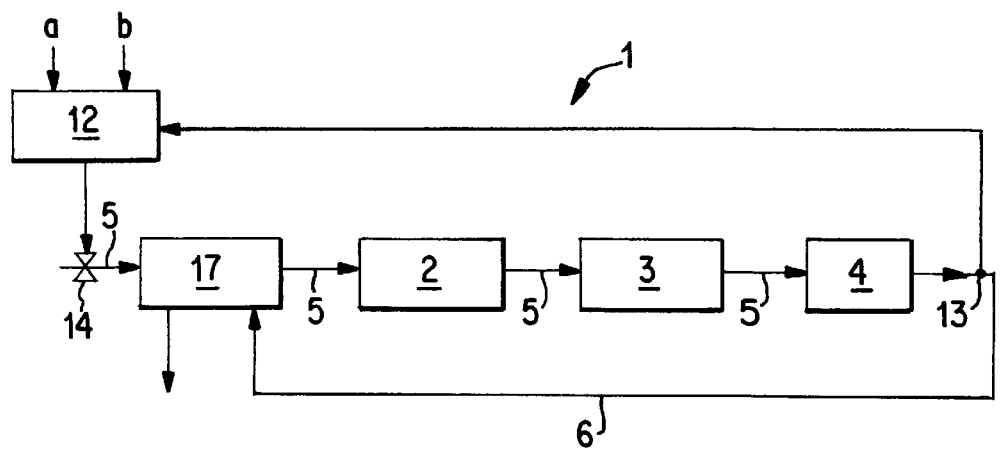

In the embodiment according to FIG. 3, parts that are the same as in FIG. 1 are once again given the same reference numbers. in this case, central component 2, cold-start component 3, and residual gas component 4 are arranged successively in the flow direction of the fuel-air mixture in first line 5. Valve 14 is likewise provided in first line 5, while two-way valve 10 and bypass line 11 can be eliminated. However, a heat exchanger 17 is also provided in first line 5 between valve 14 and central component 2. This heat exchanger is connected with second line 6, so that heat exchanger 17 is traversed by the offgas and thus the heat can be transferred from the offgas to the fuel/air mixture supplied in first line 5. Temperature sensor 13', in contrast to the two embodiments described above, is located downstream of residual gas component 4 in second line 6.

At a cold start, a reduced quantity of fuel/air mixture is again supplied. In contrast to the first two embodiments, however, this fuel/air mixture is conducted in all operating ranges through all components 2–4. Since the temperature in central component 2 is initially too low, however, no reaction takes place there at the outset. The electrical heating device enables cold-start component 3 to reach the necessary starting temperature. The reaction in cold-start component 3 causes the fuel/air mixture to absorb heat energy which is then conducted first to residual gas component 4. Then the supplied fuel/air mixture is heated by heat exchanger 17 so that a temperature rise occurs in central component 2 as well. When the temperature in central component 2 reaches the necessary starting temperature, the reaction starts there as well. The resultant heat however is largely transferred to the heat carrier chambers and not to the fuel/air mixture, so that a temperature drop is recorded by temperature sensor 13'. With the aid of control device 12, the fuel quantity can be increased by valve 14 and thus system 1 can be raised to the predetermined operating temperature $T_{des}$. Although cold-start component 3 is still traversed by the fuel/air mixture, since the main conversion takes place in central component 2, high fuel concentrations no longer develop in cold-start component 3, so that there is no need to fear its overheating.

During hot operation, the fuel/air mixture is preheated by heat exchanger 17 and conducted into central component 2. There the main conversion process takes place and at the same time heat energy is transferred to a heat-conducting medium or directly to the device to be heated. Then the mostly reacted fuel/air mixture flows through cold-start component 3 and into residual gas component 4 where the remaining conversion takes place. In this embodiment it is also possible to integrate cold-starting and residual gas components 3, 4 into a single device.

Figure 4:
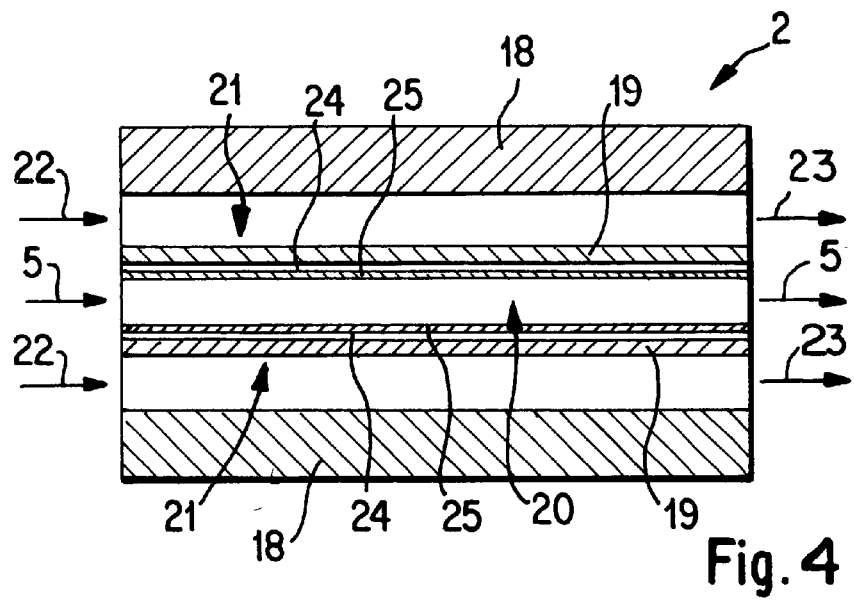
FIG. 4 shows an embodiment of the structure of the second (middle) component.

FIG. 4 shows a plate reactor with an integrated heat exchanger which can preferably be used as component 2. Plate reactor 2 consists of two plane end plates 18 arranged in parallel, between which are provided two additional partitions 19, located essentially parallel to end plates 18 and made in the form of metal films for example. This arrangement of end plates 18 and partitions 19 forms three chambers (the middle chamber being referred to hereinbelow as the main combustion chamber 20) traversed by the fuel/air mixture, while the two outer chambers (referred to below as heat-conductor chambers 21) are traversed by the heat-conducting medium or contain the heat-consuming device. For this purpose, main combustion chamber 20 is in a flow connection with first line 5 and heat-conductor chamber 21 with supply and exhaust lines 22 and 23. The flow through the main combustion chamber and heat-conductor chambers 20, 21 can be in the same or opposite directions. In addition to the embodiments shown, with a main combustion chamber 20 and two heat-conductor chambers 21, component 2 can also consist of a plurality of main combustion chambers and heat-conductor chambers 20, 21 formed by stacking a number of partitions.

The inner surfaces of partitions 19 that face main combustion chamber 20 are coated with a layer of catalyst 24 on which the catalytic oxidation of the fuel/air mixture takes place. In order to keep the temperature on catalyst layer 24 from becoming unacceptably high locally, the layer can also be covered by a diffusion layer 25. This diffusion layer can consist for example of porous $Al_2O_3$, a metal fleece, a sintered metal plate, or a porous ceramic mat made of titanium oxide. An equilibrium develops in this diffusion layer 25 between the flow of the fuel-air mixture from main combustion chamber 20 to catalyst layer 24 and of oxidized gas from catalyst layer 24 back into main combustion chamber 20. As a result, unacceptably high local temperatures can be prevented.

Such so-called hot spots can otherwise develop when the reaction rate increases in a locally limited fashion as a result of a higher fuel concentration. When a diffusion layer 25 is used, however, the increased backflow of oxidized gas from catalyst layer 24 to main combustion chamber 20 reduces the flow of fuel/air mixture to catalyst layer 24 and thus leads to self-regulation of the reaction rate and/or temperature.

The quantity of catalyst can be varied to adjust a predetermined temperature profile in main combustion chamber 20, and thus in the heat-absorbing device as a function of the travel distance. The layer thickness, the weight, or the noble metal component in the catalyst can serve as parameters. In addition, alternating areas with and without a catalyst coating can be provided as well, so that the effective catalyst quantity can be adjusted by the ratio between these areas. In addition, the diffusion layer can also be varied in terms of porosity and/or layer thickness along the travel distance. The two layers are preferably varied in such fashion that, particularly in the inlet area of main combustion chamber 20, the reaction rate is adjusted by the heat exhausted to the heat-conductor medium or to the heat-consuming device in such fashion that the maximum temperature in the entire main combustion chamber 20 remains below 600° C.

In addition, the reaction area can consist of two or more partial segments, with the inlet area serving to reduce high fuel concentrations and the outlet area serving to complete the reaction. In the inlet area, the reaction must be inhibited since the highest fuel concentrations occur there. This can be accomplished by using a thin catalyst coating and/or an efficient diffusion layer. Fuel concentration decreases during further travel through main combustion chamber 20. Therefore the catalyst coating can be increased and the diffusion layer reduced or omitted. In addition, structures that are coated with catalyst, for example metal or ceramic nets, can be provided that have a poor heat connection to partitions 19 in order to reach the starting temperature more rapidly from a cold start.

For example, "thermo-oil" can be used as the heat-conducting medium, said oil being guided through corresponding supply and exhaust lines 22, 23 through heat-conductor chambers 21. The heat-conductor can then be conducted serially or in parallel at all points in the gas-generating system at which heat energy is required. The distribution of the heat energy at the respective points can also be adjusted by suitable regulating elements as needed. The use of a heat-conducting medium however is not absolutely necessary. It is likewise possible to integrate the heat-accepting device, a reformer or evaporator for example, directly into heat-conductor chambers 21. The heat energy is then transmitted through partitions 19 directly to these devices.

Catalytic oxidation begins in the second central component 2 only when a certain starting temperature has been reached. The starting temperature in this case depends on the catalyst material used, as well as the fuel. In order to raise the temperature in second component 2 to the required starting temperature, especially from a cold start, a cold-starting component 3 is provided with a heating device. In this cold-starting component 3, the efficiency is not critical and complete oxidation is not required. Instead, assurance is provided by including a heating device in cold-starting component 3 that the temperature will rise, at least locally limited, in such fashion that catalytic oxidation begins. The heat that is released when oxidation begins locally then creates a situation in which the reaction gradually spreads to the entire cold-starting component 3 and then to entire device 1.

Figure 5A:
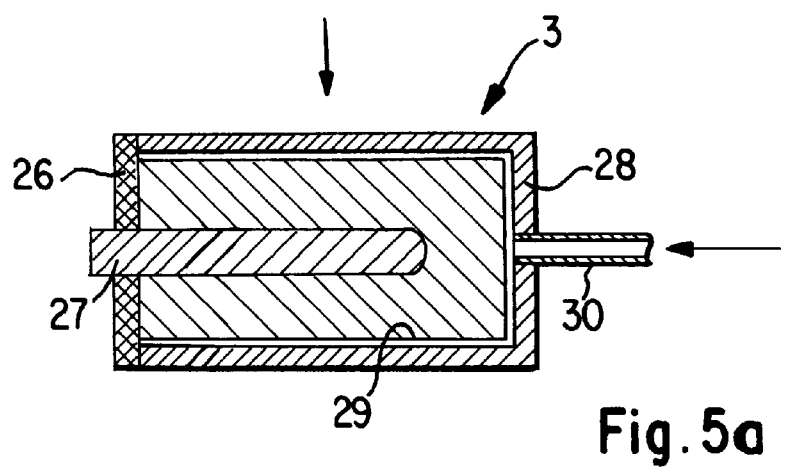
FIGS. 5a, 5b and 6 show two embodiments of the first component.

Various embodiments are possible for the first component. A first embodiment is shown in FIG. 5a, in which the cold-start component 3 consists of a porous hollow body 26 in whose interior a heating device 27, in the form of a glow plug for example, is located. Porous hollow body 26 may consist, for example, of a sintered metal housing 28 coated with a layer of catalyst 29 or saturated with catalyst material. Air flows externally around hollow body 26, with the air flow preferably being preheated by an additional electrical heating device, not shown. In addition, a thin supply line 30 is also guided through sintered metal housing 28, through which line liquid fuel is conducted into the interior of hollow body 26. Liquid methanol can be injected under pressure, for example. Line 30 is preferably arranged so that the fuel that is injected strikes heating device 27 and is evaporated there. The gaseous fuel then escapes through porous metal housing 28 and oxidizes in this housing, with the ambient air giving off heat to catalyst material 29.

Figure 5B:
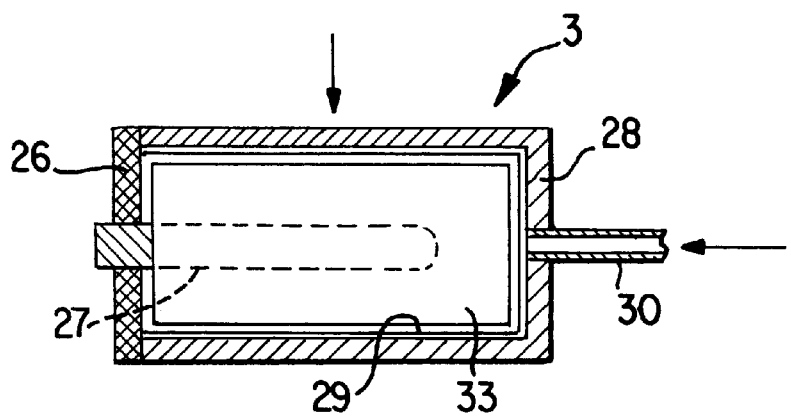

In another embodiment, shown schematically in FIG. 5*b*, the space between heating device 27 and sintered metal housing 28 can be filled with a metal body 33, in whose surface structures are formed so that the liquid fuel is optimally distributed. Thus an optimal evaporation of the fuel through porous hollow body 26 is achieved. Preferably, the metal body is located directly at glow plug 27.

Figure 6:
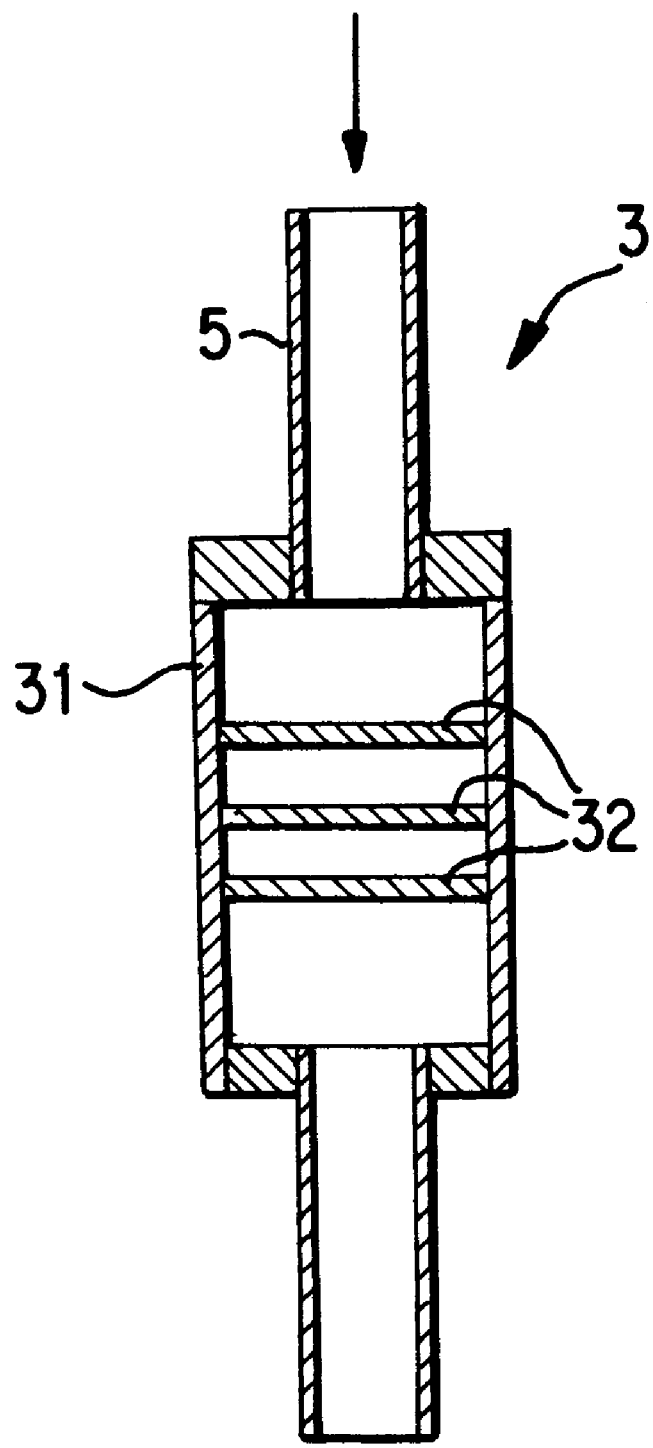

Another embodiment of first component 3 is shown in FIG. 6. In this case, the fuel is injected or atomized in the air stream and fed through line 5 to cold-start component 3, which has a cylindrical housing 31 with one or more catalyst-coated metal supports 32 therein. These metal supports 32 can be arranged transversely or lengthwise with respect to the flow direction of the fuel/air mixture. Metal supports 32 are preferably designed as nets or metal sponge and are electrically heated. In the simplest case, metal support 32 itself is designed as a heat conductor. No metal supports 32 are provided in the inlet area of the reaction chamber, which is designed as a mixing or distribution area.

In addition to the two embodiments described above for first component 3, additional embodiments are possible. For example, it can also be made as a plate reactor, with catalyst-coated electrically heated metal supports then being provided in the combustion chamber. In addition, it is also possible to design cold-starting component 3 as a packed reactor, with the inlet area being designed in this case as well as a mixing and distribution area and therefore not being filled with catalyst and with a heating device being provided in the vicinity of the catalyst packing.

The residual gas component 4 is neither heated nor connected to the heat-conducting medium. It serves exclusively to complete the reaction of any fuel residues that may escape from central component 2. Therefore, no special requirements are imposed on the shape of this residual gas component 4. It can be designed either as a packed reactor or a plate reactor or as a reactor as shown in FIG. 6. Only the heat-conductor chambers and heating devices are omitted.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A gas generating system having components for generating hydrogen gas from a gas containing hydrocarbons with the addition of heat, which system has a device for providing heat energy comprising:
    a fuel flow line defining a fuel flow path for a gaseous mixture of fuel and a gas containing oxygen;
    a main heat generating component arranged in said fuel flow path, and having a first combustion chamber containing a catalyst material, in which fuel is catalytically oxidized with the aid of said gas containing oxygen;
    means for transferring heat energy from the first combustion chamber to at least one of said components of the gas-generating system;
    a cold-start component arranged in said fuel flow path in gas flow communication with said main heat generating component, and having a second combustion chamber containing a catalyst material for oxidation of fuel, said cold-start component being traversed at least temporarily by said mixture of fuel and a gas containing oxygen; and
    a residual fuel component arranged in said fuel flow path in fuel flow communication with said main heat generating component and said cold-start component, said residual fuel component being unheated, and having a third combustion chamber for conversion of residual fuel;
    wherein the cold-start component has an electrical heater provided in the second combustion chamber therein.

2. The gas generating system according to claim 1, wherein:
    the cold-start component and the residual fuel component are arranged in the fuel flow path, downstream of the main heat generating component, relative to a flow direction of the fuel and gas mixture; and
    a heat exchanger is provided upstream of the main heat generating component, said heat exchanger being traversed by a flow of gas output from the residual fuel component.

3. The gas generating system according to claim 1, wherein:
    the cold-start component is located upstream of the main heat generating component relative to a flow direction of the mixture of fuel and gas containing oxygen in the fuel flow path, and the residual fuel component is located downstream of the main heat generating component in the first line; and
    a bypass line with a two-way control valve is interruptibly connected between an input and an output of the cold start component, parallel to the cold-start component.

4. The gas generating system according to claim 1, further comprising:
    an air supply connected to provide an input air flow to the fuel flow line, upstream of the cold-start component;
    a fuel bypass line connected parallel to the cold-start component, and terminating at an output of the cold-start component; and
    a fuel supply line which is connectible alternatively to the fuel flow line upstream of the cold-start component or to the bypass line.

5. The gas generating system according to claim 1, wherein the cold-start component comprises a porous hollow body having a coating of catalyst material on an exterior thereof, and an electrical heating device located in an interior thereof, whereby the hollow body is surrounded externally by oxygen-containing gas and fuel is directed into the interior of the hollow body.

6. The gas generating system according to claim 5, wherein a metal body is provided in the interior of hollow body for distribution and evaporation of the fuel.

7. The gas generating system according to claim 6, wherein the metal body is placed directly on a heating coil of the electric heating device.

8. The gas generating system according to claim 1, wherein the main heat generating component comprises combustion chambers and heat conductor chambers as a reactor of the filter-press design, with surfaces of partitions facing the combustion chambers being coated with a catalyst layer between the combustion and heat conductor chambers.

9. The gas generating system according to claim 8, wherein a diffusion layer is applied to a surface of the catalyst layer which is exposed to a gas flow in the combustion chambers in the main heat generating component.

10. The gas generating system according to claim 8, wherein at least one of the catalyst coating, a thickness of the diffusion layer, and a porosity of the diffusion layer is varied according to a desired temperature profile over the length of the main heat generating component.

11. The gas generating system according to claim 8, wherein the heat-conductor chambers are coupled in fluid flow communication with a flow of a heat-conductor medium that absorbs heat and transfers it to at least one component of the gas-generating system.

12. A method of operating a device for providing heat energy to a gas generating system during a startup operation phase of said device, wherein said device has a fuel flow line defining a fuel flow path for a gaseous mixture of fuel and a gas containing oxygen; a main heat generating component arranged in said fuel flow path and having a first combustion chamber containing a catalyst material, in which fuel is catalytically oxidized with the aid of said gas containing oxygen; means for transferring heat energy from the first combustion chamber to the gas-generating system; a cold-start component arranged in said fuel flow path in fuel flow communication with said main heat generating component and having a second combustion chamber containing a catalyst material for oxidation of fuel, said cold-start component being traversed at least temporarily by said mixture of fuel and a gas containing oxygen; and a residual fuel component arranged in said fuel flow path in fuel flow communication with said main heat generating component and said cold-start component, said residual fuel component being unheated and having a third combustion chamber for conversion of residual fuel; wherein the cold-start component has an electrical heater provided in the second combustion chamber therein, the cold-start component and the residual gas component are arranged in the fuel flow path, downstream of the main heat generating component, relative to a flow direction of the mixture of fuel and a gas containing oxygen, and a heat exchanger is provided upstream of the main heat generating component, said heat exchanger being traversed by a flow of fuel output from the cold-start and residual gas components; said process comprising:

upon initiating operation of said device at commencement of said startup operation phase, said heater heating said cold-start component to a temperature at which a chemical reaction commences therein;

transferring heat generated from said cold-start component to said main heat generating component via said heat exchanger;

limiting fuel delivered to said fuel flow line at starting, until a predetermined starting temperature is reached in the main heat generating component; and thereafter, increasing the fuel delivered to said fuel flow line, so that the main heat generating component is brought to a predetermined operating temperature which is greater than said predetermined starting temperature, thereby completing said startup operation phase.

13. A method of operating a device for providing heat energy to a gas generating system during a startup operation phase of said device, wherein said device has a fuel flow line defining a fuel flow path for a gaseous mixture of fuel and a gas containing oxygen; a main heat generating component arranged in said fuel flow path and having a first combustion chamber containing a catalyst material, in which fuel is catalytically oxidized with the aid of said gas containing oxygen; means for transferring heat energy from the first combustion chamber to the gas-generating system; a cold-start component arranged in said fuel flow path in fuel flow communication with said main heat generating component and having a second combustion chamber containing a catalyst material for oxidation of fuel, said cold-start component being traversed at least temporarily by said mixture of fuel and a gas containing oxygen; and a residual fuel component arranged in said fuel flow path in fuel flow communication with said main heat generating component and said cold-start component, said residual fuel component being unheated and having a third combustion chamber for conversion of residual fuel; wherein the cold-start component has an electrical heater provided in the second combustion chamber therein, the cold-start component is located upstream of the main heat generating component relative to a flow direction of the fuel and gas mixture in the fuel flow path, the residual fuel component is located downstream of the main heat generating component in the first line, and a bypass line with a two-way control valve is interruptibly connected between an input and an output of the cold start component parallel to the cold-star component, said method comprising:

upon initiating operation of said device at commencement of said startup operation phase, said heater heating said cold-start component to a temperature at which a chemical reaction commences therein;

causing the fuel and gas mixture to flow through the cold-start component upon initiating operation of said device;

detecting a temperature in the first combustion chamber; and when detected temperature in said first combustion chamber reaches a first predetermined value, causing said fuel and gas mixture to bypass the cold-start component by guiding the fuel and gas mixture through the bypass line.

14. The method according to claim 13, wherein:

upon initiating operation of said device, a reduced quantity of fuel/air mixture is supplied to the cold-start component via the fuel flow path; and after a predetermined starting temperature is reached in the main heat generating component the device is brought to a predetermined operating temperature by increasing fuel delivery to the main heating component.

15. A method of operating a device for providing heat energy to a gas generating system during a startup operation phase of said device, wherein said device has a fuel flow line defining a fuel flow path for a gaseous mixture of fuel and a gas containing oxygen; a main heat generating component arranged in said fuel flow path and having a first combustion chamber containing a catalyst material, in which fuel is catalytically oxidized with the aid of said gas containing oxygen; means for transferring heat energy from the first combustion chamber to the gas-generating system; a cold-start component arranged in said fuel flow path in fuel flow communication with said main heat generating component and having a second combustion chamber containing a catalyst material for oxidation of fuel, said cold-start component being traversed at least temporarily by said mixture of fuel and a gas containing oxygen; a residual fuel component arranged in said fuel flow path in fuel flow communication with said main heat generating component and said cold-start component, said residual fuel component being unheated, and having a third combustion chamber for conversion of residual gas; an air supply connected to provide an input air flow to the fuel flow line, upstream of the cold-start component; a fuel bypass line connected parallel to the cold-start component and terminating at an input of the main heat generating component; and a fuel supply line which is connectible alternatively to the fuel flow line upstream of the cold-start component or to the bypass line, wherein the cold-start component has an electrical heater provided in the second combustion chamber therein, said method comprising:

upon initiating operation of said device at commencement of said startup operation phase, said heater heating said cold-start component to a temperature at which a chemical reaction commences therein;

connecting the fuel supply line to the fuel flow line upon initiating operation of said device;

detecting a temperature in the first combustion chamber; and when detected temperature in said first combustion chamber reaches a first predetermined value connecting said fuel supply line to the fuel bypass line.

16. The method according to claim 15, wherein:

upon initiating operation of said device, a reduced quantity of fuel/air mixture is supplied to the cold-start component via the fuel flow path; and after a predetermined starting temperature is reached in the main heat generating component the device is brought to a predetermined operating temperature by increasing fuel delivery to the main heat generating component.

* * * * *